(12) United States Patent
Baker

(10) Patent No.: US 7,188,575 B2
(45) Date of Patent: Mar. 13, 2007

(54) WATERCRAFT WITH WAVE DEFLECTING HULL

(76) Inventor: Elbert H. Baker, 21 Baldwin St., Hudson, OH (US) 44236

( * ) Notice: Subject to any disclaimer, the term of this patent is extended or adjusted under 35 U.S.C. 154(b) by 0 days.

(21) Appl. No.: 11/028,274

(22) Filed: Jan. 3, 2005

(65) Prior Publication Data

US 2006/0144312 A1    Jul. 6, 2006

(51) Int. Cl.
    *B63B 1/00*    (2006.01)
(52) U.S. Cl. .................. 114/61.2; 114/61.1; 114/61.27
(58) Field of Classification Search ............... 114/61.1, 114/61.2, 61.27, 61.29, 61.3, 61.31, 63, 56.1; D12/304
    See application file for complete search history.

(56) References Cited

U.S. PATENT DOCUMENTS

| 966,000 | A |  | 8/1910 | Polk |
|---|---|---|---|---|
| 1,677,495 | A |  | 7/1928 | Schmitt |
| 1,855,076 | A |  | 4/1932 | Warner |
| 2,366,035 | A |  | 12/1944 | Leone |
| 2,369,129 | A |  | 2/1945 | Bell et al. |
| 2,378,822 | A | * | 6/1945 | Barry ........................ 114/67 A |
| 2,989,939 | A |  | 6/1961 | Tatter |
| 3,018,749 | A |  | 1/1962 | Beurs |
| 3,126,856 | A |  | 3/1964 | Fuller |
| 3,410,240 | A |  | 11/1968 | Hutchison et al. |
| 3,528,380 | A | * | 9/1970 | Yost ........................... 114/283 |
| 3,934,531 | A |  | 1/1976 | Allen |
| 4,003,325 | A |  | 1/1977 | Allen |
| 4,776,294 | A |  | 10/1988 | Childs |
| RE33,359 | E |  | 10/1990 | Lang |
| 5,191,849 | A | * | 3/1993 | Labrucherie et al. ...... 114/61.2 |
| 5,619,944 | A |  | 4/1997 | Baker |
| 5,676,087 | A |  | 10/1997 | Baker |
| 5,988,088 | A |  | 11/1999 | Ishida et al. |
| 6,095,073 | A |  | 8/2000 | Burkett |
| 6,131,529 | A |  | 10/2000 | Smith |
| 6,311,635 | B1 | * | 11/2001 | Vaton ......................... 114/272 |

FOREIGN PATENT DOCUMENTS

FR         1317347       12/1961
WO    WO 9001000 A1    2/1990

* cited by examiner

*Primary Examiner*—Ed Swinehart
(74) *Attorney, Agent, or Firm*—Hahn, Loeser & Parks, LLP

(57) ABSTRACT

The invention is directed to a watercraft hull design that comprises a hull having a bow, stem, top, and bottom. A wedge-shaped wave spreading system is located at a forward portion of the craft. The wave-contacting surface planes of the wave spreading system are positioned substantially perpendicular to the plane of smooth water. The bottom edge of the wave spreading system is positioned near the level of smooth water when the watercraft is at cruising speed. The wave spreading system has a forward apex which forms a substantially perpendicular or vertical leading wedge to the plane of water. Since the apex and planes of the wave spreader are substantially perpendicular to the water, oncoming waves encountered by the wave spreader will tend to be deflected horizontally. Accordingly, the watercraft will more easily "cut through" waves instead of riding over them. Located rearwardly of the wave spreader, an internal hull prow is spaced from the wave spreading system, creating an air space therebetween. The air space extends from the rearward surface of the wave spreader to the front of internal hull prow, creating a buffer zone or dampening space to further minimize any wave action not detected by the spreading system.

16 Claims, 3 Drawing Sheets

WATERCRAFT WITH WAVE DEFLECTING HULL

TECHNICAL FIELD

The present invention relates generally to watercraft. More specifically, the present invention relates to watercraft hulls designed to displace water in a manner to provide enhanced stability and movement through the water.

BACKGROUND OF THE INVENTION

Conventional recreational and commercial watercraft, for the most part, incorporate hulls which have V-shaped bottoms, with the V-shape, at its lowest point, forming a keel. The V-shape is thought to enable the boat, as speed is increased, to be pushed upwardly out of the water, as the water traversing against the boat's bow is forced sideways and downwardly at a vector to the outer shape of the hull. Such designs have been used for years, but have various deficiencies.

One detriment to such hull designs is that the draft of the boat tends to sit relatively deep in the water in relation to the length and beam of the boat, thus requiring sufficient depth of water to accommodate that draft. Another detriment to such hull designs is that they require a relatively large amount of force (and horsepower) to propel such a boat forward at a sufficient speed to stabilize the boat, i.e., to force the water sideways and downwardly as the boat travels generally horizontally through the water.

With V-shaped hull designs, initially, as velocity begins to increase from zero, the bow of the boat acts much like a plow, digging into and through the surface of the water. This creates what is known as a "bow wave". As velocity increases more, the bow tends to be forced upwardly by the sideways and downward force being applied to the water by the curvature of the V-shape of the hull being forced horizontally forward and up over the bow wave.

Finally, when sufficient velocity is approached and then reached, the apex of the force on the V-shaped hull travels aftwardly along the hull, forcing the boat more upwardly to an increasing degree until a point is reached at which the bow, now out of the water, tends, by force of gravity, to descend toward the water, pivoting on the apex of the force against the sides and bottom of the V-shaped hull. This pivoting serves to raise the stem of the boat as the bow descends until the whole boat is lifted upwardly into what is known as a planing position. At this point, because there is relatively less water contacting the hull, drag from that water is reduced and the boat is correspondingly able to go significantly faster given the same amount of force propelling the boat forward.

Of course, as might be anticipated, the hydraulic force of the water against the V-shaped hull is substantial, and thus at least an equally substantial counteracting force must be provided by the engine of the boat. Significant power is required to get the boat up to the planing position and to maintain it there. The ultimate speed of the boat, when planing, depends on the specific design of the V-shaped hull, the weight (and weight distribution) of the boat, and the available power, i.e., the size of the engine and the size and pitch of the propeller which is driven by the engine. However, in all cases, the forward movement of the boat, at any speed, whether up on plane or not, is counteracted by both sideways and downward vectors of force produced by the relative hydraulic movement of the water against the hull.

The amount of fuel needed to power a boat at a given velocity is in direct proportion to the overall degree of each of the forces needed to be overcome to move that boat forward over a given distance. The greater those forces, the greater will be the amount of fuel consumed. Thus as a general proposition, if fuel economy is a concern, hull designs are desirable which tend to reduce the overall amount of opposing forces directed against the hull during forward movement of the boat. One approach to this is the use of relatively flat bottom hulls wherein there is less counteracting hydraulic force imposed against the hull as the boat moves forward. A flat hull is more readily pushed directly up over the bow wave to a position substantially on top of the water, creating less displacement of water by the hull in the dynamic mode as distinguished from the static mode. In other words, dynamic displacement of water is significantly less with a flat bottom boat than with a V-shaped bottom. On the other hand, static displacement, when the boat is at rest, is substantially the same for a flat bottom or a V-bottom boat, given equivalent boat weights and hull surface contact with the water.

Watercraft or boats with flat bottom hulls have been known for years. Small fishing boats have been manufactured using this design. Such boats have a relatively shallow draft to enable sports fishermen to get into shallow waters along shorelines, into shallow, swampy areas, and into lakes, ponds and streams which are not sufficiently deep to accommodate the draft of conventional V-bottom boats.

Such designs have evolved into what are popularly called "bass boats". Bass boat hulls are relatively narrow, in relation to length, with generally flat bottoms and relatively shallow V-shapes, if any. The draft of these boats is relatively shallow in comparison to V-shaped hulls. Once up on a plane, the vector force of the water is mostly downwardly, forcing these boats to rise up out of the water to a greater degree at relatively slower speeds, thus ultimate velocity can be greater, and relatively less engine power may be required to reach a given velocity.

The down side is that, because bass boats are relatively narrow beamed and because there is relatively little sideways or lateral force being exerted against the hull of a bass boat, there is correspondingly less lateral stability, and, due to a relatively narrow beam, such boats tend to be susceptible to laterally moving waves. Such flat bottom hulls are also generally more susceptible to waves as the hull rides more on top of the waves rather than slicing somewhat through waves as V-shaped hulls do to a greater degree. Also, such boats do not steer as easily or as precisely as those with distinct, V-shaped hulls, due again to the fact that such boats incur relatively less opposing sideways forces, being those forces which tend to hold a boat to a straight forward movement. Such forces if present can be precisely altered by a rudder device at the stem. Therefore, when steered to turn, bass boats tend to skid laterally sideways more readily, thus making turning a much less precise and controllable skidding action, rather than the positive, more precisely controllable action of V-shaped hulls. Bass boat designs rarely incorporate sponsons, thus, for the sake of safety, it is almost necessary to slow some high-powered bass boats down before turning, to both effect a more precise turn and to prevent the boat from flipping over.

Both types of hulls are susceptible to wave action and may produce instability depending on the height and direction of waves. Both types of hulls have large surfaces which absorb the force of waves, and cause significant vibration, vertical or lateral movement, or a combination of these. Other boats include hull designs which incorporate pontoons or sponsons for lateral stability and floatation, but such systems are undesirable for a number of reasons.

There is thus a need for a watercraft that overcomes the deficiencies of the prior art, and efficiently maneuverable in the water, while providing increased fuel efficiency and a smooth, stable ride, even in rough water.

SUMMARY OF THE INVENTION

The invention is therefore directed to a watercraft hull design that overcomes the deficiencies of prior designs. The watercraft comprises a hull having a bow, stern, top, and bottom. A wedge-shaped wave-spreading multi-hull at a forward portion of the craft. The wave-contacting surface planes of the wave spreading hull system are positioned substantially perpendicular to the plane of smooth water, at least adjacent the water surface.

The wave spreading hull portions have a forward apex which forms a substantially perpendicular or vertical leading wedge to the plane of water. Since the apex and planes of the wedge shaped hull portions are substantially perpendicular to the water, oncoming waves encountered by the hull portions will tend to be deflected horizontally. Accordingly, the watercraft will more easily "cut through" waves instead of riding over them.

Located rearwardly of the wave spreaders, an internal hull prow portion is spaced from the wave spreading surfaces, creating an air space therebetween. The air space extends from the rearward surface of the wave spreader to the front of internal hull prow, creating a dampening space to further minimize any wave action not deflected by the hull portions. The internal hull prow portion extends to a flat-bottomed section of the hull. The air space further eliminates any surface that would tend to ride up onto a wave.

The portion of the hull that contacts water while the watercraft is at cruising speed is spaced rearwardly of the air space. This portion of the hull that contacts the water is generally flat, as opposed to the V-shape commonly found in watercraft. This flat-bottomed hull enables the watercraft to easily reach a plane, while displacing a smaller amount of water than typical V-shaped hulls. The multi-hull design according to the invention also facilitates displacement of water between hulls, to further minimize forces acting on the boat.

DETAILED DESCRIPTION

Reference will now be made in detail to an embodiment of the invention as illustrated in the accompanying drawings.

Figure 1:
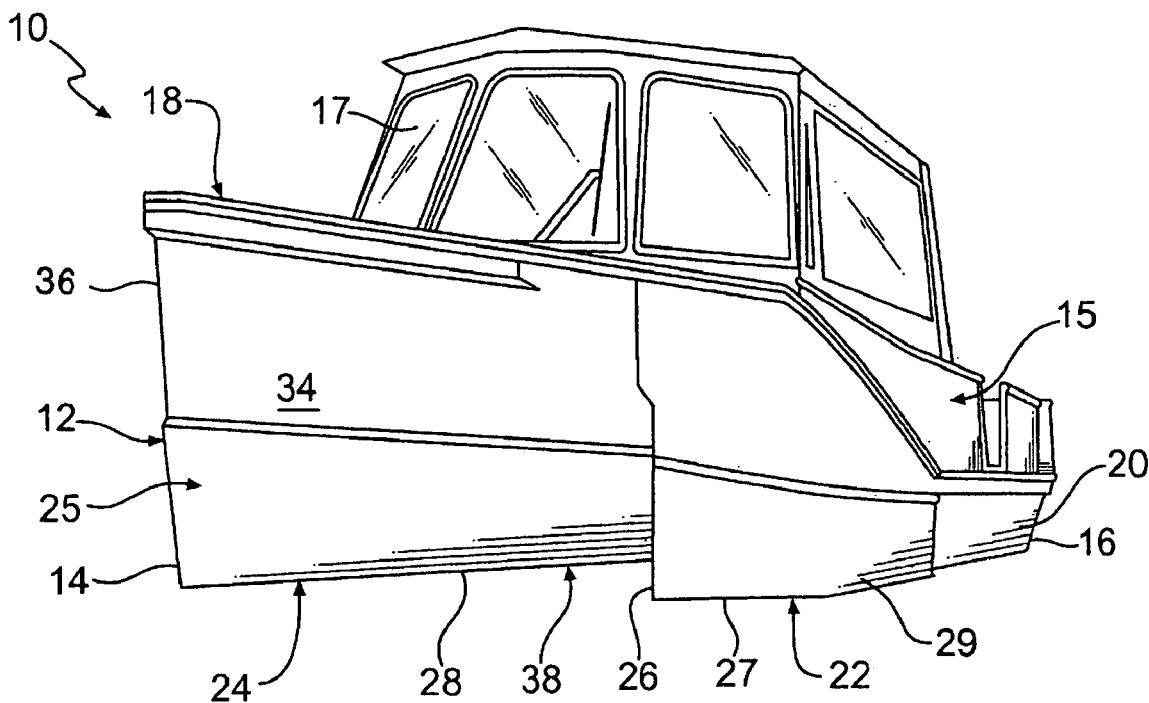
FIG. 1 is a perspective view of a watercraft and hull in accordance with an embodiment of the present invention.
Figure 2:
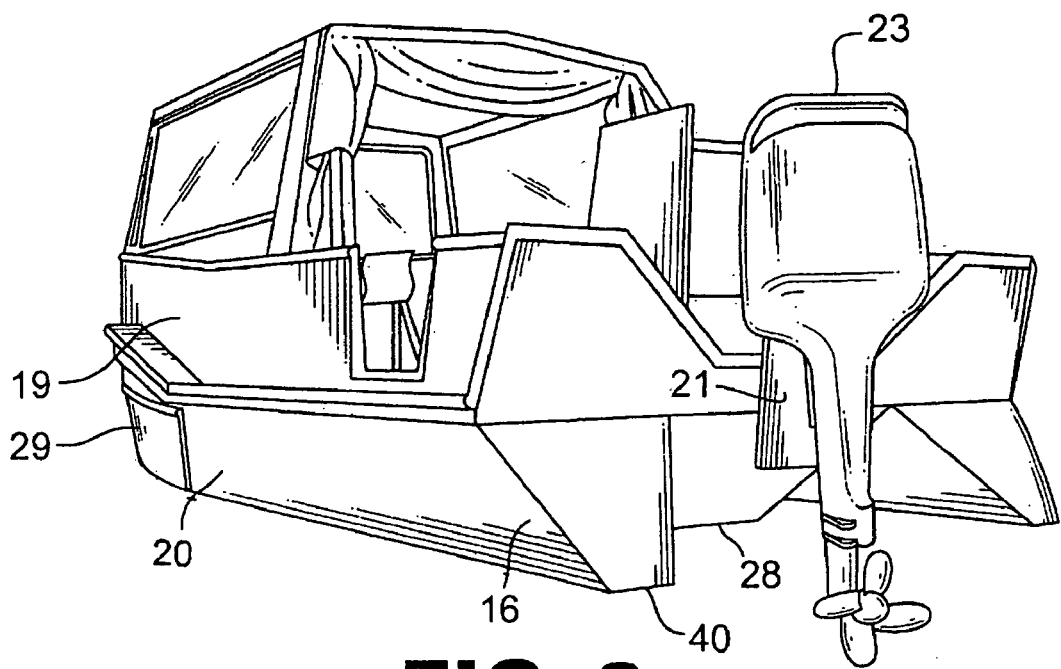
FIG. 2 is a back perspective view of a watercraft and hull of FIG. 1.

Turning to FIGS. 1–2, an embodiment of a watercraft, generally identified by reference number 10, is illustrated. The watercraft 10 comprises a hull 12 having a bow 14, stern, 16, port side 18, and starboard side 20. The watercraft 10 may be built out of aluminum with a formed hull or sheets with welded seams. The hull 12 and other portions of watercraft 10 could also be fabricated from other materials such as, for example, FRP, high-density polyethylene, other metals, or other suitable materials.

Figure 3:
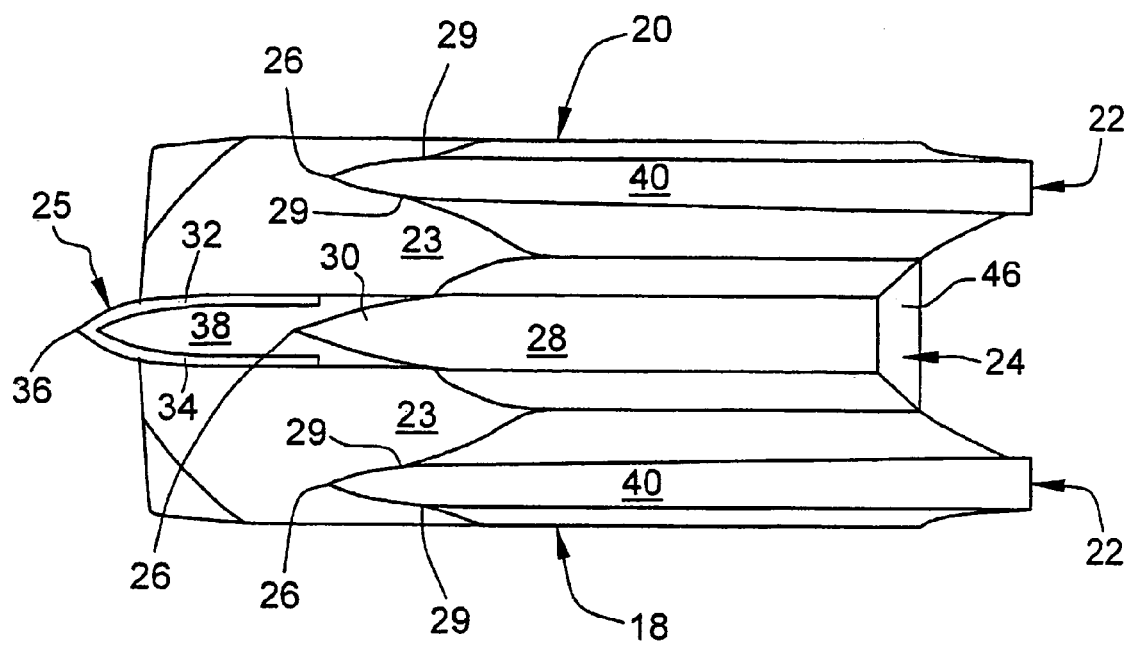
FIG. 3 is a schematic bottom view of an embodiment of a hull design according to the invention.

As illustrated in FIGS. 1 and 2, and with reference to the schematic of the hull configuration in FIG. 3, the watercraft 10 comprises a hull 12 which is designed to cut through waves or wakes of other boats, and minimize the forces acting on the hull to reduce the pounding experienced with typical hull designs. The hull 12 further reduces lateral action on the hull which produces pitching. The hull 12 is of a multi-hull configuration, having first and second outer deep V-hulls 22 (only one shown in FIG. 1) and a central wave-deflecting hull 24. The hulls 22 and 24 each have a unique configuration to allow the above advantages to be realized. A gunwale 15 is mounted above hull 12, and a windshield 17 is mounted above the gunwale and toward the bow 14. The gunwale 15 has side rails 19, forming a passenger compartment for use of the boat 10. A motor mount 21 is provided for mounting of a boat motor 23 to propel the watercraft 10.

The hull portions 22 and 24 each have a very narrow profile, and outer hulls 22 each have a pointed V-shaped front-end wave spreading edge 26. The central hull 24 extends forward of the outer hulls 22, and has a wave spreading structure 25 associated therewith. The extent that the central hull 24 extends forwardly of the outer hulls 22 can vary depending on the size of the watercraft 10, and the type of water body the craft is designed to operate in. In general, the central hull 24 length may be from between 5to 25% or more greater than the outer hull lengths. With reference to FIG. 3, the hull 24 is configured to have a substantially flat bottom portion 28, with a front end 30 defined by a substantially vertically oriented wedge shape. The front end 30 would normally be exposed to oncoming waves, but in the present invention, the wave spreading structure 25 deflects any waves away from the portion 30. This results in the hull portions 30 and 28 being recessed or internal to the wave contacting surfaces of the hull 12. The wave spreading structure 25 may be formed of sheet material, configured into a wedge shape having first and second sides 32 and 34 and a front edge 36 directed forwardly. The sides 32 and 34 of the wedge shape present substantially vertical surfaces to facilitate water displacement, resulting in a configuration that cuts through any waves, minimizing wave forces acting on the hull 12. This also results in the boat 10 remaining substantially level as it moves across the water, even if waves or wake are encountered. Further, the boat 10 remains substantially level at different speeds when on plane, even if loaded. The sides 32 and 34 extend toward the rear of boat 10, forming a cavity behind the front edge 36. The sides 32 and 34 may extend to a position which is adjacent the position that water contacts the internal prow formed by the portions 28 and 30 as the boat 10 moves across the water. The sides also extend toward the water to a position just above the level of smooth water as the boat 10 moves through the water.

Each hull portion 22 is also formed with a large, somewhat vertical front edge profile, presenting the approaching water with a knife-edge type of profile. This edge cuts through any waves or wake and displaces water laterally of each hull portion 22 along with the wave spreader 25 associated with center hull 24. From the front edges 26, the hull portions 22 are formed to have substantially flat bottoms 40, with a slight upward taper 27 formed at the forward end of each hull 22 to facilitate water displacement and planing of the boat during operation. The front edge 26 and forward side sections 29 of the hull portions 22 form v-shaped or wedge shaped portions which present somewhat vertically oriented wave spreading surfaces. Each hull portion 22 acts to spread waves laterally of the boat, and into the spaces 23 between hull sections. The spaces 23 between hulls 22 and 24 are designed to accommodate the volume of water displaced by the hulls based upon the size of the boat.

The hull portions 22 may extend to a position that is spaced rearwardly from the front of center hull 24, such that oncoming wavers are first contacted by center hull 24, and subsequently contacted by the hulls 22. The hulls 22 are configured to cut through and deflect with minimal resistance, the initially deflected oncoming waves, before contacting the remaining portions of hull 12. The hull portions 22 are designed such that the forward sections are positioned just above the smooth water level when the craft is in operation, such that smooth water will not impose substantial forces on the hull portions 22. Oncoming waves are spread and directed immediately away from craft 10 by the substantially vertically oriented wedge surfaces 32 and 34 of hull portion 24, and the surfaces 29 of hull portions 22, which cut through and deflect water with less drag than other hull configurations. The height of the edge 26 of portions 22 may be suitable for the environment in which the watercraft 10 is to be used. Each front edge 26 on hulls 22 are designed to extend out of flat water to a height above any expected waves based on the size of boat and type of water bodies such a boat would be operated in. For example, for watercraft adapted for use in larger bodies of water with larger waves, the vertical height of the forward sections of portions 22 may have a greater height.

Since the wave spreading configuration of each hull portion 22 and 24 is designed to deflect oncoming waves substantially horizontally, the wave-contacting surfaces 32 and 34 are preferably substantially perpendicular, to the smooth water surface while the watercraft is at cruising speed. However, it is also contemplated that the wave-contacting surface planes of the portions 22 and 24 may be scooped or at a slight acute or obtuse angle to the smooth water while the watercraft is at cruising speed. For example, a slight obtuse angle between the plane of smooth water and the wave-contacting surface planes of the wave spreader 25 will tend to deflect oncoming waves more upwardly and therefore increasingly drive the watercraft through the waves without substantial pitching of the hull.

Referring again to FIG. 3, and the hull portion 24, there may be formed an air cavity 38 located rearwardly of the wave spreader 25. The air cavity 38 facilitates minimizing any pitching and pounding against the waves by eliminating forward hull surfaces that would tend to ride up on or pound against waves. The air cavity 38 extends from the upper edges of the hull portion 24 and terminates at the internal hull prow 30. Internal hull prow 30 comprises the forward end of the hull bottom, and extends rearwardly as a substantially flat-bottomed section 28. In this embodiment, internal hull prow 30 is located at approximately sixty percent (60%) of the length of hull 12 as measured from the stern 14, but lengths between approximately 50 to 90% are contemplated. The length of hull bottom 28, and thus the location of internal hull prow 30, can vary further for more particular designs associated with different applications or environments within the scope of the present invention. Due to the wave spreading action of the hulls 22 and 24, generally, internal hull prow 30 encounters mostly smooth water. If desired to provide a further surface for deflection of any wave, the wave contacting surface planes of internal hull prow 30 may be formed in a slight v-bottom configuration, but forming a substantially flat bottom 28 toward the stern 16 of craft 10.

The hull bottom 28 is located aft of the air cavity 38. A problem with conventional flat-bottomed watercraft has been their tendency to pitch and roll upon encountering waves. With the present invention, this problem is greatly reduced by the wave spreading hull portions 22 and 24. As the surfaces 29, 32, and 34 spread or deflect oncoming waves substantially horizontally away from the hull 12, waves which would tend to cause a flat bottomed surface to pitch up are reduced significantly.

The hull bottoms 28 and 40 generally provide a large flat surface transitioning from the forward wave-deflecting surfaces or from internal prow 30, such that the hull displaces less water than conventional v-bottomed hulls at cruising speed. The smaller displacement of water enables the watercraft to cruise higher in the water, as compared to conventional v-bottomed watercrafts. Additionally, the watercraft leaves a smaller wake and requires less power for propulsion. Therefore, fuel economy is increased as compared to conventional v-bottomed boat hulls. Further, at the stern 16 of the craft 10, the bottoms 40 of the outer hulls 22 extend to a position rearward of the rear wall or motor mount 21, to extend the flat bottom surface which rides on the water during operation. The center hull 24 is then configured such that the bottom surface 28 terminates before reaching the stern. Water deflected by the wave deflecting surfaces of hulls 22 and 24, is thereby channeled through the spaces 23 between hulls, and at the stern, only the outer hulls have bottom surfaces contacting the water, to provide a relief zone between hulls 22 at the rear of the craft 10. An upwardly angled transition surface 46 extends from the stern to the bottom surface 28 at the rear of bottom surface 40 to the gunwale and back wall 21.

In this embodiment of the watercraft 10 and hull 12, each of the hull portions 22 and 24 has at its top end, upwardly angled transition surfaces 42 and 44, extending from the apex 26. If waves are encountered which extend up to this height, these surfaces 42 and 44 will also deflect waves away from the hull. Further, to facilitate stabilizing the craft 10 in the water, whether under power or at rest, each hull portion 22 and 24 may be formed in sections, with a lower section being substantially vertically oriented relative to smooth water, and upper sections which are angled outwardly to form a larger water displacing structure.

Figure 4:
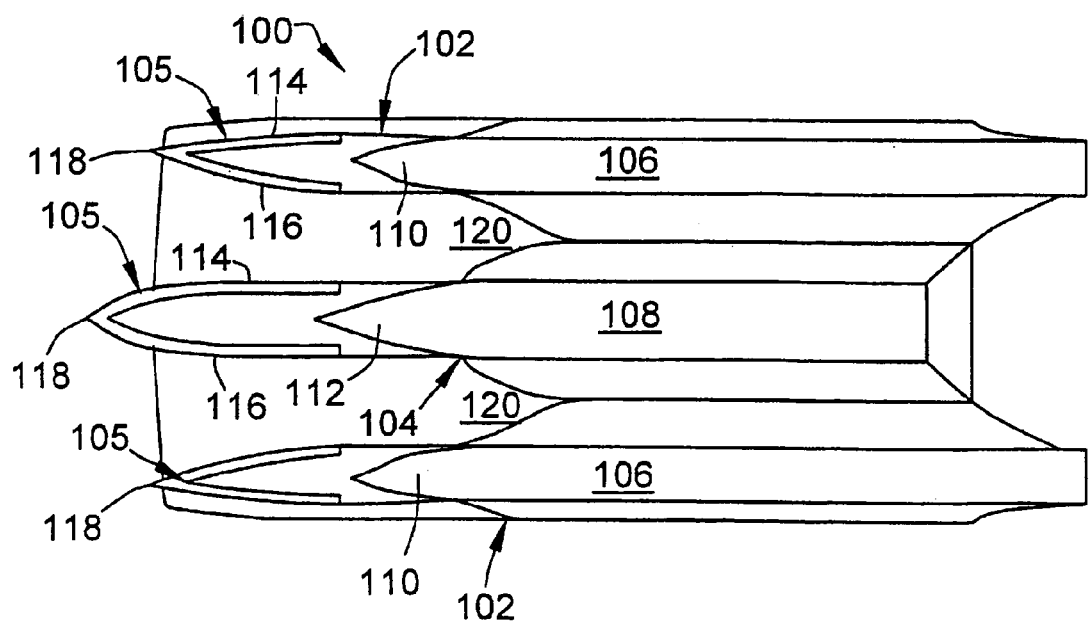
FIG. 4 is a schematic bottom view of an alternate embodiment of a hull design according to the invention.

Turning to FIG. 4, an alternate embodiment of the hull configuration is shown at 100, and again may comprise a central hull 104 and two outer hulls 102, each of which has a wave spreading structure 105 associated therewith. In this embodiment, the wave spreading structure 105 of the outer hulls 102 and central hull 104, extends to approximately the same forward position, such that each will engage and deflect waves. As in the prior embodiment, the hull portions 102 and 104 may be configured to have a substantially flat bottom portions 106 and 108, with a upwardly tapered front ends 110 and 112 respectively. The front ends 110 and 112 would normally be exposed to oncoming waves, but in this embodiment, the wave spreading structures 105 deflect any waves away from the portions 110 and 112. This results in the hull portions being recessed or internal to the wave contacting surfaces of the hull 12. The wave spreading structures 105 may again be configured as a wedge shape having first and second sides 114, 116 and a front edge 118 directed forwardly. The sides 114 and 116 of the wedge shape present substantially vertical surfaces to facilitate water displacement, resulting in a configuration that cuts through any waves, minimizing wave forces acting on the boat 100. This also results in the boat 100 remaining substantially level as it moves across the water, even if waves or wake are encountered. Further, the boat 10 remains substantially level at different speeds when on plane, even if loaded. The sides 114 and 116 extend toward the rear of boat 100, forming a cavity behind the front edge 118. The sides 114 and 116 may extend to a position which is adjacent the position that water contacts the internal prow formed by the portions 110 and 112 as the boat 10 moves across the water. The sides also extend toward the water to a position just above the level of smooth water as the boat 100 moves through the water. Each hull portion 102 and 104 acts to spread waves laterally, and into the spaces 120 between hull sections. The spaces 120 between hulls are designed to accommodate the volume of water displaced by the hulls based upon the size of the boat.

Figure 5:
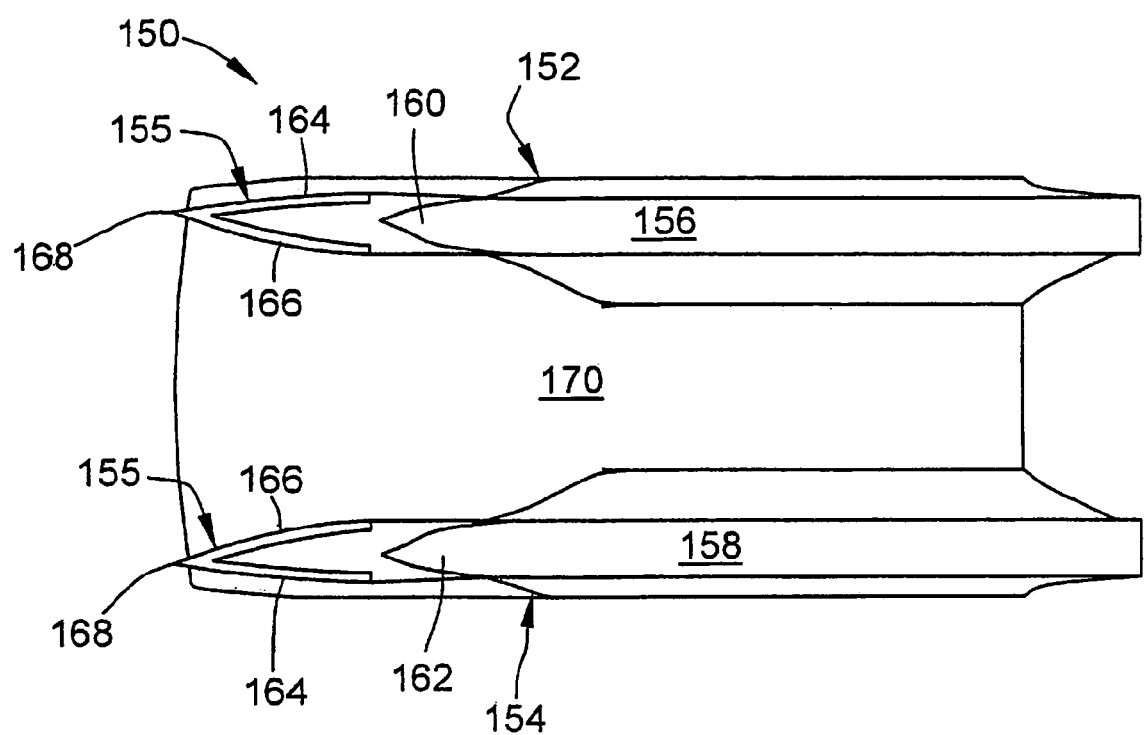
FIG. 5 is a schematic bottom view of an alternate embodiment of a hull design according to the invention.

Turning to FIG. 5, an alternate embodiment of the hull configuration is shown at 150, and may comprise first and second outer hulls 152 and 154, each of which has a wave spreading structure 155 associated therewith. In this embodiment, the wave spreading structure 155 of the outer hulls 152 and 154, extend to a forward position of the hull, such that each will engage and deflect waves away from the other portions off hull. As in the prior embodiments, the hull portions 152 and 154 may be configured to have a substantially flat bottom portions 156 and 158, with a upwardly tapered front ends 160 and 162 respectively. The front ends 160 and 162 would normally be exposed to oncoming waves, but in this embodiment, the wave spreading structures 155 deflect any waves away from the portions 160 and 162. This results in the hull portions being recessed or internal to the wave contacting surfaces of the hull. The wave spreading structures 155 may again be configured as a wedge shape having first and second sides 164, 166 and a front edge 168 directed forwardly. The sides 164 and 166 of the wedge shape present substantially vertical surfaces to facilitate water displacement, resulting in a configuration that cuts through any waves, minimizing wave forces acting on the boat. This also results in the boat remaining substantially level as it moves across the water, even if waves or wake are encountered. Further, the boat remains substantially level at different speeds when on plane, even if loaded. The sides 164 and 166 extend toward the rear of boat 150, forming a cavity behind the front edge 168. The sides 164 and 166 may extend to a position which is adjacent the position that water contacts the internal prow formed by the portions 160 and 162 as the boat 150 moves across the water. The sides also extend toward the water to a position just above the level of smooth water as the boat 150 moves through the water. Each hull portion 152 and 154 acts to spread waves laterally, and into the spaces between hull sections. The spaces 170 between hulls are designed to accommodate the volume of water displaced by the hulls based upon the size of the boat.

The foregoing disclosure is illustrative of embodiments of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A watercraft comprising:
   a monolithic hull having a bow, a stern, a port side, and a starboard side; a hull having at least two outer hull portions, wherein the at least two outer hull portions are formed with a bottommost portion formed as a substantially flat ski type surface extending from adjacent the stern toward the bow and terminating in an internal prow formed at a position intermediate the bow and stern, and wave spreading structures formed forwardly of the internal prow portions of the outer hull portions, said wave spreading structures comprising a wedge shaped structure having a forward apex and two side walls extending rearwardly from the apex, wherein said water spreading structure creates an air cavity forward of said internal prow between the wave spreading structure and the internal prow, wherein waves impinging upon the wave spreading structure are deflected away from the substantially flat bottom portions and internal prow portions of the hull portions.

2. The watercraft as recited in claim 1, further comprising a center hull portion and wherein each of the outer hull portions further comprises a stern portion extending rearwardly of the center hull portion.

3. The watercraft as recited in claim 1, wherein the wave spreading structure extends to a position adjacent the level of smooth water when the watercraft is operating in the water.

4. The watercraft as recited in claim 1, wherein internal hull prow comprises a substantially vertical leading edge which transitions to the substantially flat bottommost portion extending rearwardly.

5. The watercraft as recited in claim 1, wherein a center hull portion is provided between the two outer hull portions, with the center hull portion is formed with a bottommost portion formed as a substantially flat ski type surface extending from adjacent the stern toward the bow and terminating in an internal prow formed at a position intermediate the bow and stern, and a wave spreading structure formed adjacent the bow, said wave spreading structure comprising a wedge shaped structure having a forward apex and two side walls extending rearwardly from the apex, wherein said wave spreading structure creates an air cavity forward of said internal prow between the wave spreading structure and the internal prow of the center hull portion.

6. The watercraft as recited in claim 5, wherein a center hull portion extends forwardly of the outer hull portions.

7. The watercraft as recited in claim 6, wherein the center hull portion has a length which is approximately 5 to 25% greater than the outer hull lengths.

8. The watercraft as recited in claim 1, wherein the internal prow is positioned at approximately 50 to 90% of the length of the hull extending from the stern.

9. The watercraft as recited in claim 1, wherein water deflected by the wave deflecting surfaces of the hull portions is channeled through spaces formed between hull portions, the spaces providing a relief zone between hull portions at the stern of the watercraft.

10. A monolithic watercraft hull comprising
   a hull having a bow, a stern, a port side, a starboard side, and a bottom; with at least two outer hull portions at the port and starboard sides spaced rearwardly of the bow, the at least two outer hull portions having a substantially flat ski type bottommost surfaces portion extending from at least adjacent the stern toward the bow and terminating intermediate the bow and stern, and wave spreading structures positioned forwardly of the prow portions of the at least two outer hulls, the wave spreading structures comprising a wedge shaped structure having a forward apex and two side walls extending rearwardly from the apex, the side walls forming substantially upright surfaces extending rearwardly from the front apex,
   at least one center hull portion having a substantially flat ski type bottommost portion extending from at least adjacement the stern toward the bow and terminating intermediate the bow and stern, and a wave spreading structure positioned at the bow forwardly of the at least one center hull, the wave spreading structure comprising a wedge shaped structure having a forward apex and two side walls extending rearwardly from the apex.

11. The watercraft hull as recited in claim 10, wherein each of the outer hull portions further comprises a stern portion hull extending rearwardly of the center hull portion.

12. The watercraft hull as recited in claim 10, wherein the wave spreading structure extends to a position adjacent the level of smooth water when the watercraft is operating in the water.

13. The watercraft hull as recited in claim 10, wherein an air space is formed between the wave spreading structure and the front surface intermediate the bow and stern.

14. The watercraft hull as recited in claim 10, wherein a center hull portion extends forwardly of the outer hull portions.

15. The watercraft hull as recited in claim 14, wherein the center hull portion has a length which is approximately 5 to 25% or more greater than the outer hull lengths.

16. The watercraft hull as recited in claim 10, wherein water deflected by the wave deflecting surfaces of the hull portions is channeled through spaces formed between hull portions, the spaces providing a relief zone between hull portions at the stern of the watercraft.

* * * * *

UNITED STATES PATENT AND TRADEMARK OFFICE
CERTIFICATE OF CORRECTION

PATENT NO. : 7,188,575 B2
APPLICATION NO. : 11/028274
DATED : March 13, 2007
INVENTOR(S) : Elbert H. Baker It is certified that error appears in the above-identified patent and that said Letters Patent is hereby corrected as shown below:

In claim 2, column 8, line 11, delete "watereraft" and insert --watercraft--

In claim 3, column 8, line 17, delete "watereraft" and insert --watercraft--

In claim 8, column 8, line 41, delete "watereraft" and insert --watercraft--

In claim 13, column 9, line 12, delete "watereraft" and insert --watercraft--

In claim 14, column 10, line 1, delete "watereraft" and insert --watercraft--

In claim 15, column 10, line 4, delete "watereraft" and insert --watercraft--

In claim 16, column 10, line 11, delete "watereraft" and insert --watercraft--

Signed and Sealed this

Eighth Day of May, 2007

JON W. DUDAS
*Director of the United States Patent and Trademark Office*